United States Patent
Yang et al.

(10) Patent No.: US 10,394,315 B2
(45) Date of Patent: Aug. 27, 2019

(54) CONTENT-AWARE VIRTUAL REALITY SYSTEMS AND RELATED METHODS

(71) Applicant: Acer Incorporated, New Taipei (TW)

(72) Inventors: Chao-Kuang Yang, New Taipei (TW); Ruey-Ching Shyu, New Taipei (TW); Tzu-Lung Chuang, New Taipei (TW); Yu-Chun Huang, New Taipei (TW)

(73) Assignee: ACER INCORPORATED, New Taipei (TW)

( * ) Notice: Subject to any disclaimer, the term of this patent is extended or adjusted under 35 U.S.C. 154(b) by 237 days.

(21) Appl. No.: 15/604,810

(22) Filed: May 25, 2017

(65) Prior Publication Data

US 2018/0341325 A1    Nov. 29, 2018

(51) Int. Cl.
*G06F 3/01*    (2006.01)
*H04N 13/344*    (2018.01)

(52) U.S. Cl.
CPC ........... *G06F 3/012* (2013.01); *H04N 13/344* (2018.05)

(58) Field of Classification Search
CPC .................................................... G06T 19/006
See application file for complete search history.

(56) References Cited

U.S. PATENT DOCUMENTS

| | | | | |
|---|---|---|---|---|
| 9,866,286 B1* | 1/2018 | Qu | | H04B 7/26 |
| 2006/0262141 A1* | 11/2006 | Satoh | | G06F 3/0325 |
| | | | | 345/633 |
| 2008/0136916 A1* | 6/2008 | Wolff | | G06F 3/012 |
| | | | | 348/169 |
| 2015/0103152 A1* | 4/2015 | Qin | | G02B 13/08 |
| | | | | 348/53 |
| 2015/0185831 A1* | 7/2015 | Madau | | G06F 3/012 |
| | | | | 345/156 |
| 2015/0317832 A1* | 11/2015 | Ebstyne | | G06F 3/011 |
| | | | | 345/633 |
| 2016/0253840 A1 | 9/2016 | Lee | | |
| 2016/0260251 A1* | 9/2016 | Stafford | | G06T 19/006 |
| 2017/0026560 A1* | 1/2017 | Whitehouse | | B64D 43/00 |

(Continued)

FOREIGN PATENT DOCUMENTS

| | | |
|---|---|---|
| CN | 106710351 A | 5/2017 |
| TW | 201631544 A | 9/2016 |
| TW | 201633104 A | 9/2016 |

*Primary Examiner* — Phong X Nguyen
(74) *Attorney, Agent, or Firm* — McClure, Qualey & Rodack, LLP

(57) ABSTRACT

Virtual reality (VR) systems and related methods are provided. A representative VR system includes: content detection circuitry configured to determine a type of VR content from among inside-out VR content and outside-in VR content; and processor circuitry configured to execute instructions to display the VR content in accordance with the type of VR content determined. A representative method includes: determining a type of VR content provided to a head mounted display from among inside-out VR content and outside-in VR content; and displaying the VR content to the user with the head mounted display in accordance with the type of VR content determined such that, if the VR content is determined to be inside-out VR content, the head mounted display displays the inside-out VR content, and if the VR content is determined to be outside-in VR content, the head mounted display displays the outside-in VR content.

18 Claims, 5 Drawing Sheets

(56) References Cited

U.S. PATENT DOCUMENTS

| | | | |
|---|---|---|---|
| 2017/0150139 A1* | 5/2017 | Lee | H04N 13/356 |
| 2017/0345215 A1* | 11/2017 | Khedkar | G06F 3/012 |
| 2018/0097975 A1* | 4/2018 | Osman | H04N 13/106 |
| 2018/0151000 A1* | 5/2018 | Liv | G06F 3/012 |
| 2018/0181207 A1* | 6/2018 | Fullam | G06F 1/3215 |
| 2018/0266847 A1* | 9/2018 | Trythall | G01C 25/005 |
| 2019/0041980 A1* | 2/2019 | Trythall | G09G 5/38 |

\* cited by examiner

CONTENT-AWARE VIRTUAL REALITY SYSTEMS AND RELATED METHODS

BACKGROUND

Technical Field

The disclosure relates to the presentation of virtual reality content to a user.

Description of the Related Art

Virtual reality (VR) is the concept involved with the immersion of a user in a computer-generated environment by simulating the user's presence in the environment in a manner that permits user interaction. Recent commercial trends in VR technology employ the use of head mounted displays (HMDs) that provide the wearer with stereoscopic images portraying the VR environment. In order to facilitate user interaction, tracking systems are provided for determining one or more of the movement of a user's head ("head tracking") and position of a user and/or of an accessory ("motion tracking"). Typically, tracking systems are provided from among two types, "inside-out" and "outside-in".

For an "inside-out" tracking system, one or more sensors (e.g., gyroscopes, accelerometers and/or magnetometers) are implemented onboard (i.e., moveable with) the HMD to perform head tracking. Notably, head tracking may involve determining movement with respect to one or more of multiple axes, including forward and backward movement about an x-axis (pitch), shoulder-to-shoulder movement about a y-axis (roll), and side-to-side movement about a z-axis (yaw). In contrast, an "outside-in" tracking system uses sensors external to the HMD to determine head tracking. By way of example, an outside-in tracking system may use sensors (e.g., cameras) mounted within a room in order to determine movements of the HMD within that room. In such a system, the HMD may serve as a sensor hub for receiving movement information from the room-mounted sensors, with the movement information then being provided to an attached computing device (e.g., a PC) for performing movement computations. Outside-in systems also may be used for position tracking of objects other than an HMD, such as an accessory (e.g., a controller) used to simulate an object in the VR environment thus permitting interaction by a user with the accessory/object in both the physical and VR environments. It should also be noted that some outside-in systems employ one or more onboard sensors. Thus, designation of an HMD as inside-out or outside-in typically is based on the presence (or not) of an HMD configuration for interacting with external sensors.

Generally, the inside-out VR tracking systems and outside-in VR tracking systems are not compatible with each other, and VR content typically is designed for one or the other of these two types of systems. For example, inside-out VR content typically is coded using one developer platform (e.g., MICROSOFT® WINDOWS® HOLOGRAPHIC™), wherein outside-in VR content typically is coded using another developer platform (e.g., STEAM® VR).

It is desired to provide a more robust VR system.

SUMMARY

Virtual reality (VR) systems and related methods are provided. In this regard, an example embodiment of a VR system for displaying VR content to a user comprises: content detection circuitry configured to determine a type of VR content from among inside-out VR content and outside-in VR content; and processor circuitry configured to execute instructions to display the VR content in accordance with the type of VR content determined.

Another example embodiment of VR system comprises: a head mounted display having a head piece and a display, the head piece being configured to be worn by a user to position the display, the display being configured to display the VR content to the user; the head mounted display further comprising a first onboard sensor and a sensor hub, the first onboard sensor having sensor circuitry and being configured to determine movement of the head mounted display, the sensor hub having hub circuitry and being configured to receive movement information corresponding to movement of the head mounted display as detected by a first external sensor remote from the head mounted display; wherein the head mounted display is configured to selectively display, via the display, inside-out VR content in accordance with the movement of the head mounted display based on the first onboard sensor and outside-in VR content in accordance with the movement of the head mounted display associated with detection by the first external sensor.

An example embodiment of a method for displaying VR content to a user with a head mounted display comprises: determining a type of VR content provided to a head mounted display from among inside-out VR content and outside-in VR content; and displaying the VR content to the user with the head mounted display in accordance with the type of VR content determined such that, if the VR content is determined to be inside-out VR content, the head mounted display displays the inside-out VR content, and if the VR content is determined to be outside-in VR content, the head mounted display displays the outside-in VR content.

Another example embodiment of a method comprises providing a head mounted display configured to display VR content to a user; and selectively displaying inside-out VR content to the user with the head mounted display in accordance with movement of the head mounted display based on a first onboard sensor, and outside-in VR content to the user with the head mounted display in accordance with movement of the head mounted display relative to a first external sensor remotely positioned from the head mounted display.

Other features and/or advantages will become apparent from the following detailed description of the preferred but non-limiting embodiments. The following description is made with reference to the accompanying drawings.

DETAILED DESCRIPTION

Figure 1:
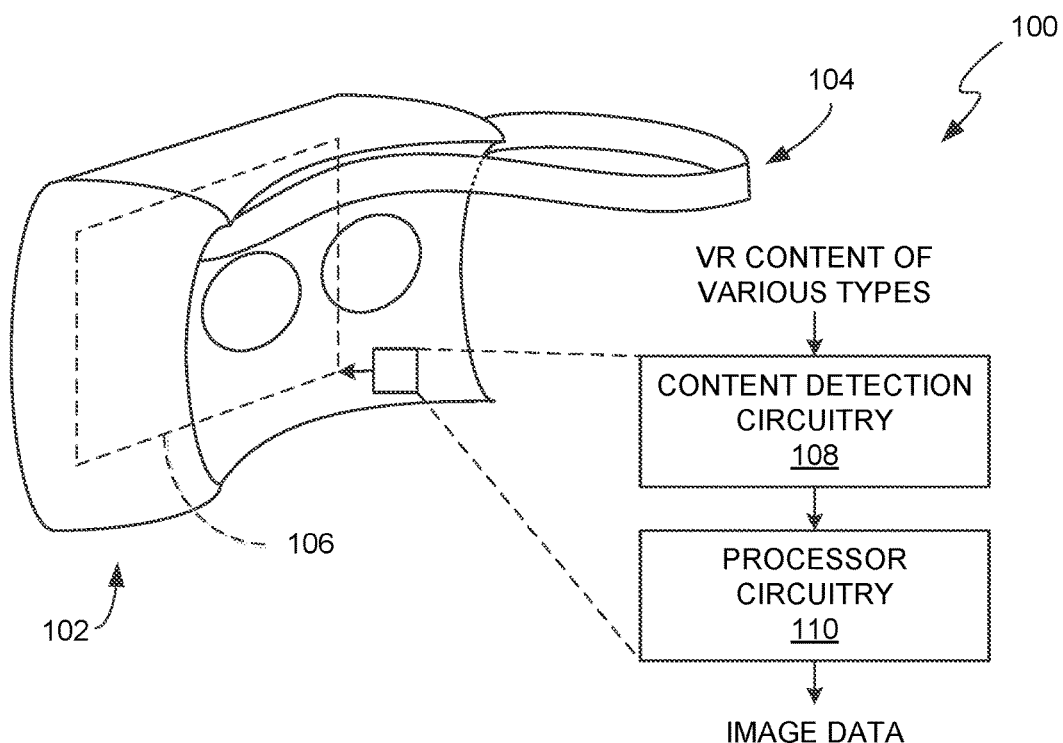
FIG. 1 is a schematic diagram of an example embodiment of a virtual reality (VR) system.

Having summarized various aspects of the present disclosure, reference will now be made in detail to that which is illustrated in the drawings. While the disclosure will be described in connection with these drawings, there is no intent to limit the scope of legal protection to the embodiments disclosed herein. Rather, the intent is to cover all alternatives, modifications and equivalents included within the scope of the disclosure as defined by the appended claims.

In this regard, virtual reality (VR) systems and related methods are provided that, in some embodiments, involve the display of VR content to a user via a head mounted display (HMD). Such an HMD is configured to display VR content of varied types as content processing for the HMD is adapted to accommodate differences associated with the varied types of VR content.

An example embodiment of a VR system is depicted schematically in FIG. 1. As shown in FIG. 1, VR system 100 incorporates a head mounted display (HMD) 102 that includes a head piece 104 and a display 106 (e.g., a stereoscopic display that incorporates two separate display components). Head piece 104 is configured to be worn by a user to position the display in front of the user's eyes. Display 106 is configured to display VR content to the user wearing head piece 104 so that the user can view a VR environment based on image data associated with the VR content.

Content detection circuitry 108 and processor circuitry 110 communicate with HMD 102. In particular, content detection circuitry 108 is configured to determine a type of VR content. For instance, content detection circuitry 108 may determine whether the VR content being provided for display is inside-out type VR content (e.g., VR content based on the MICROSOFT® WINDOWS® HOLOGRAPHIC™ platform) or outside-in type VR content (e.g., VR content based on the STEAM® VR platform). Processor circuitry 110 is configured to execute instructions to display the VR content on display 106 in accordance with the type of VR content determined by content detection circuitry 108. In particular, in response to determining that the VR content is of the inside-out type, processor circuitry 110 is configured to enable VR system 100 to perform head tracking using one or more sensors (e.g., gyroscopes, accelerometers and/or magnetometers) onboard HMD 102 (not shown in FIG. 1). In contrast, in response to determining that the VR content is of the outside-in type, processor circuitry 110 is configured to enable HMD 102 of VR system 100 to perform sensor hub functions, such as receiving head and/or accessory movement information, from one or more external sensors (also not shown in FIG. 1). It should be noted that content detection circuitry 108 and/or processor 110 may be implemented onboard HMD 102 or in a separate component, such as a personal computer (not shown in FIG. 1) with which HMD 102 may communicate.

Figure 2:
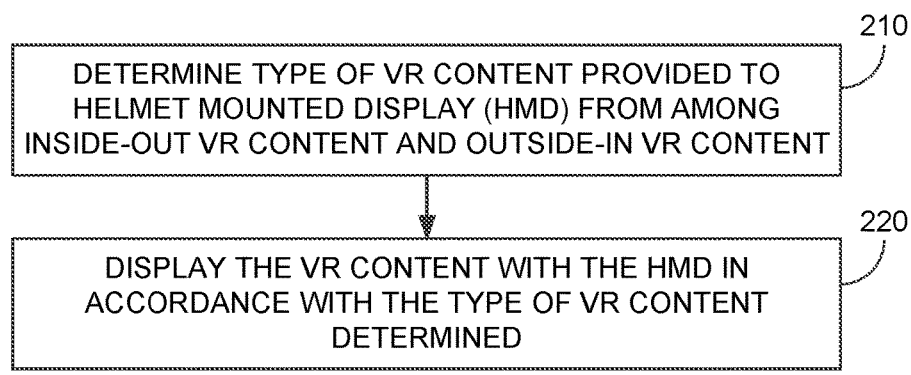
FIG. 2 is a flowchart of an example embodiment of a method that may be associated with a VR system.

FIG. 2 is a flowchart depicting an embodiment of a method (functionality) that may be associated with a VR system such as VR system 100 of FIG. 1, for example. As shown in FIG. 2, the method (or process) 200 may be construed as beginning at block 210, in which a type of VR content provided to an HMD is determined from among inside-out VR content and outside-in VR content. Then, as depicted in block 220, the VR content is displayed with the HMD in accordance with the type of VR content determined. Specifically, if the VR content is determined to be inside-out VR content, the HMD displays the inside-out VR content using sensor data from inside-out system, and if the VR content is determined to be outside-in VR content, the HMD displays the outside-in VR content according to sensor data acquired from outside-in system (note that the sensor data of the outside-in system may, or may not, incorporate inside-out sensor data). It should be noted that the aforementioned functions can be performed by one or more of various components in various embodiments.

Figure 3:
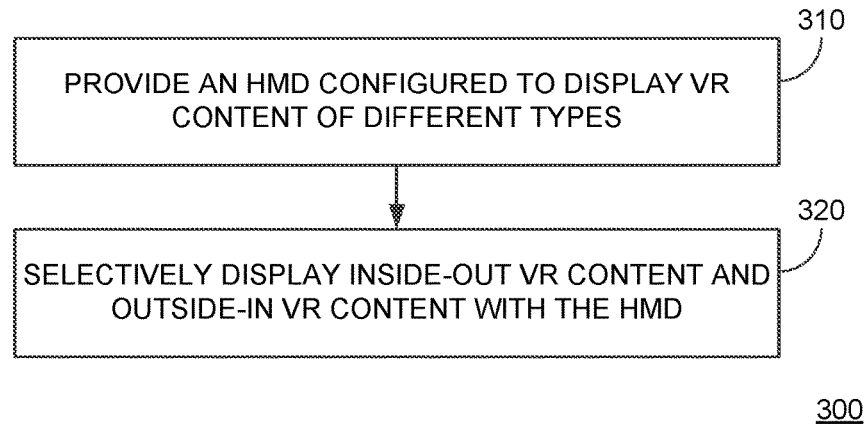
FIG. 3 is a flowchart of another example embodiment of a method.

Another embodiment of a method that may be associated with a VR system is depicted in FIG. 3. As shown in FIG. 3, the method 300 may be construed as beginning at block 310, in which an HMD configured to display VR content is provided. Specifically, the HMD is configured to display VR content of different types. Then, as shown in block 320, inside-out VR content and outside-in VR content are selectively displayed by the HMD. That is, at some times, inside-out VR content is displayed by the HMD and, at other times, outside-in VR content is displayed by the HMD. In particular, when the inside-out VR content is being displayed, the HMD displays the inside-out VR content in accordance with movement of the HMD based on one or more onboard sensors (i.e., sensors mounted to or otherwise adapted to be movable with the HMD). When outside-in VR content is being displayed, the HMD displays the outside-in VR content in accordance with movement of the HMD relative to one or more external sensors (i.e., sensors positioned remotely from the HMD).

Figure 4:
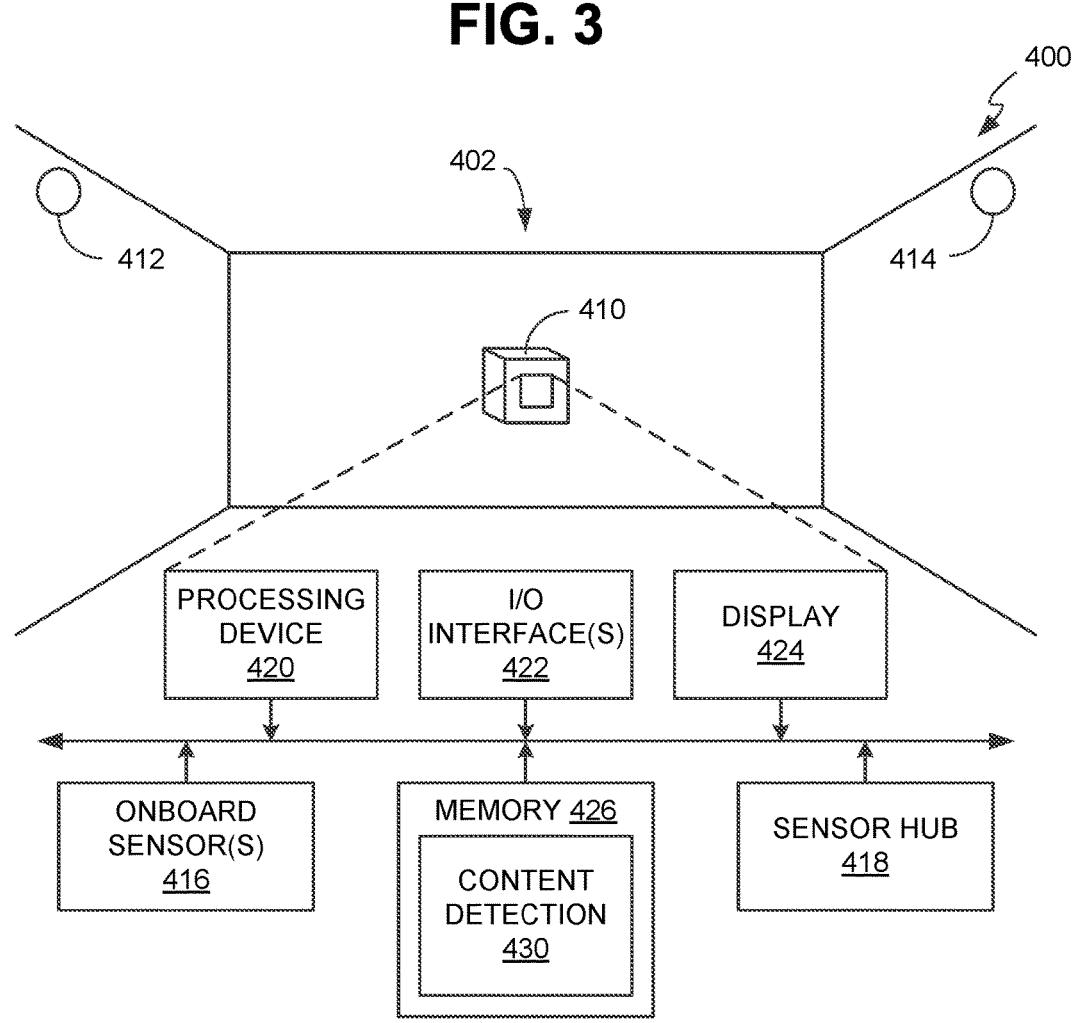
FIG. 4 is a schematic diagram of another example embodiment of a VR system.

An example embodiment of a VR system that may exhibit the functionality presented in FIG. 3 is depicted schematically in FIG. 4. In FIG. 4, VR system 400 is implemented in a space 402 (e.g., a room with enclosure, such as walls, or a space partition with open walls) that facilitates occupancy by a user, and includes an HMD 410, as well as one or more external sensors (e.g., external sensors 412, 414) that are positioned remotely from the HMD. HMD 410 is configured to display VR content to the user such as described before. HMD 410 includes at least one onboard sensor (e.g., sensor 416) incorporating sensor circuitry that is configured to determine movement of the head mounted display. By way of example, one or more onboard sensors of various types may be used, such as gyroscopes, accelerometers, magnetometers, and/or other environmental sensors (e.g. acoustic sensors) that assist in identifying the space type. Additionally, HMD 410 incorporates a sensor hub 418 including hub circuitry that is configured to receive movement information corresponding to movement of the HMD as detected by one or more of the external sensors. In operation, HMD 410 is configured to selectively display inside-out VR content in accordance with movement of the HMD based on one or more of the onboard sensors (e.g., sensor 416) and outside-in VR content in accordance with the movement of the HMD associated with detection by at least one of the external sensors (e.g., external sensor 412).

As is also shown in FIG. 4, HMD 410 includes a processing device 420 (processing circuitry), input/output (I/O) interface(s) 422, a display 424, and a memory 426, with each communicating across a local data bus 428. Additionally, memory 426 incorporates content detection system 430, which includes executable instructions for particularly configuring processing device 420 in order to perform the aforementioned functionality. It should be noted that, in other embodiments, one or more of processing device 420, memory 426, and/or content detection system 430 may reside in a remote computing unit (e.g., a PC) that communicates with HMD 410.

The processing device 420 may include a custom made or commercially available processor, a central processing unit (CPU) or an auxiliary processor among several processors associated with HMD 410, a microprocessor, a semiconductor-based microprocessor (in the form of a microchip), one or more application specific integrated circuits (ASICs), a plurality of suitably configured digital logic gates, and other electrical configurations comprising discrete elements both individually and in various combinations to coordinate the overall operation of the system.

The I/O interface(s) 422 may facilitate communication with one or more devices, such as a personal computer (PC) that may be used to provide VR content to HMD 410.

The memory 426 can include any one or a combination of volatile memory elements (e.g., random-access memory (RAM, such as DRAM, and SRAM, etc.)) and nonvolatile memory elements. The memory typically comprises a native operating system, one or more native applications, emulation systems, or emulated applications for any of a variety of operating systems and/or emulated hardware platforms, emulated operating systems, etc. For example, the applications may include application specific software which may comprise some or all the components of the content detection system 430. In accordance with such embodiments, the components are stored in memory and executed by the processing device 420.

One of ordinary skill in the art will appreciate that the memory 426 can, and typically will, comprise other components which have been omitted for purposes of brevity. Note that in the context of this disclosure, a non-transitory computer-readable medium stores one or more programs for use by or in connection with an instruction execution system, apparatus, or device.

In some embodiments, HMD 410 may be configured to exhibit a default setting (i.e., an inside-out VR content mode) to display inside-out VR content. Responsive to detecting the presence of outside-in VR content, content detection system 430 may cause processing device 420 to switch modes to an outside-in VR content mode in order to display outside-in VR content. Thus, a single HMD may be adapted to display VR content of multiple VR content types.

In determining the type of VR content available for display by an HMD, some embodiments involve the determination of whether a driver associated with a type of VR content is active. For instance, in some embodiments, the associated content detection system may determine whether a driver for outside-in VR content (e.g., a STEAM® VR driver) is active. In other embodiments, the associated content detection system may determine whether a component associated with outside-in VR content is present. By way of example, outside-in VR content may be associated with one or more external sensors and/or one or more accessories. Switching between modes for the display of VR content types may be based, at least in part, on detection (or lack thereof) of such a component.

Figure 5A:
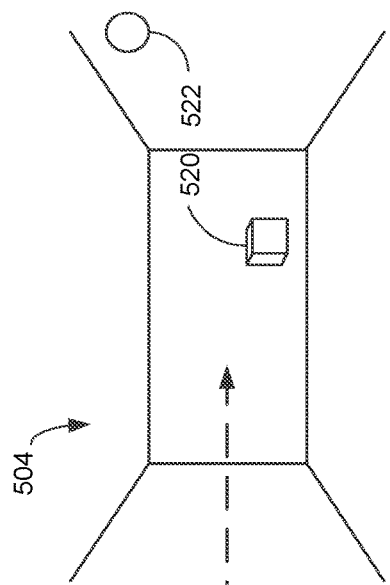
FIGS. 5A and 5B are schematic diagrams of another example embodiment of a VR system, showing a head mounted display adapting to varied types of VR content.
Figure 5A:
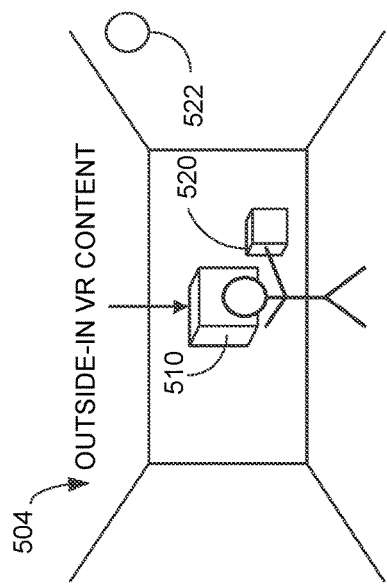
Figure 5B:
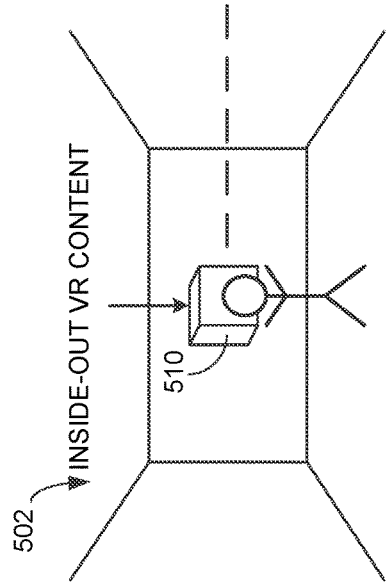
Figure 5B:
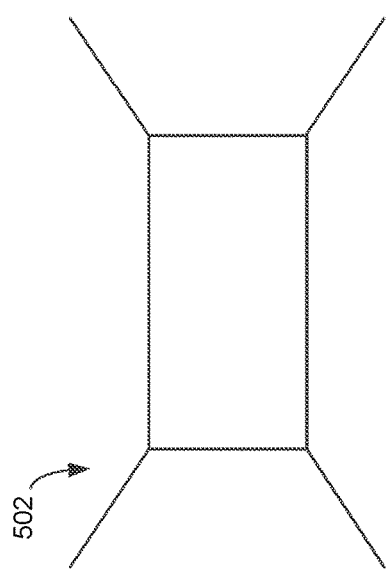

FIGS. 5A and 5B are schematic diagrams of another example embodiment of a VR system, showing an HMD adapting to (switching between) varied types of VR content. In particular, FIGS. 5A and 5B depict two spaces (502, 504) in which a user is able to operate HMD 510. Notably, space 502 is configured to provide inside-out VR content to the HMD and space 504 is configured to provide outside-in VR content to the HMD. So configured, as shown in FIG. 5A, as the user is present in space 502 with HMD 510, HMD 510 is enabled to display the inside-out VR content provided to the HMD. As mentioned before, this may be attributable to a default mode of operation oriented toward display of inside-out VR content or to switching to an inside-out VR content mode based on detection (or lack thereof) of one or more indicators associated with the presence of inside-out VR content. By way of example, such indicators may include, but are not limited to, deactivation of a driver associated with outside-in VR content, determining that an application associated with outside-in VR content is inactive (running in the background), and/or lack of a signal associated with an external component (e.g., an accessory or sensor). As the user moves from space 502 to space 504 (indicated by the dashed line), HMD 510 adapts to the changing environment.

Specifically, as shown in FIG. 5B, positioning of HMD 510 within space 504 enables the HMD to detect the presence of outside-in VR content. In some embodiments, this may involve detecting activation of a driver associated with outside-in VR content, determining that an application associated with outside-in VR content is active (running in the foreground), or detecting a signal associated with an external component (e.g., an accessory 520 or sensor 522). In response to detecting the presence of outside-in VR content, HMD 510 switches to the outside-in VR content mode and begins displaying the outside-in VR content to the user based on movement information provided by external sensor 522. Notably, immersion by the user in the VR environment presented by the outside-in VR content may involve manipulation of the accessory 520, which may appear as a VR object and/or provide enhance functionality. It should also be noted that the user may move HMD 510 to another environment, such as back to space 502, which would cause the HMD to switch back to an inside-out mode of operation. Further, when moving to space 504, a determination may be made as to whether outside-in sensor data can be acquired. If not, in some embodiments, a navigation option may be provided for the user to navigate (by inside-out sensors of the HMD) back to the previously identified inside-out sensor area (e.g., space 502) so that display of the inside-out VR content may be facilitated. In such an embodiment, the system could determine (either continuously or intermittently) whether outside-in sensor data and/or inside-out sensor data is/is not available.

Figure 6:
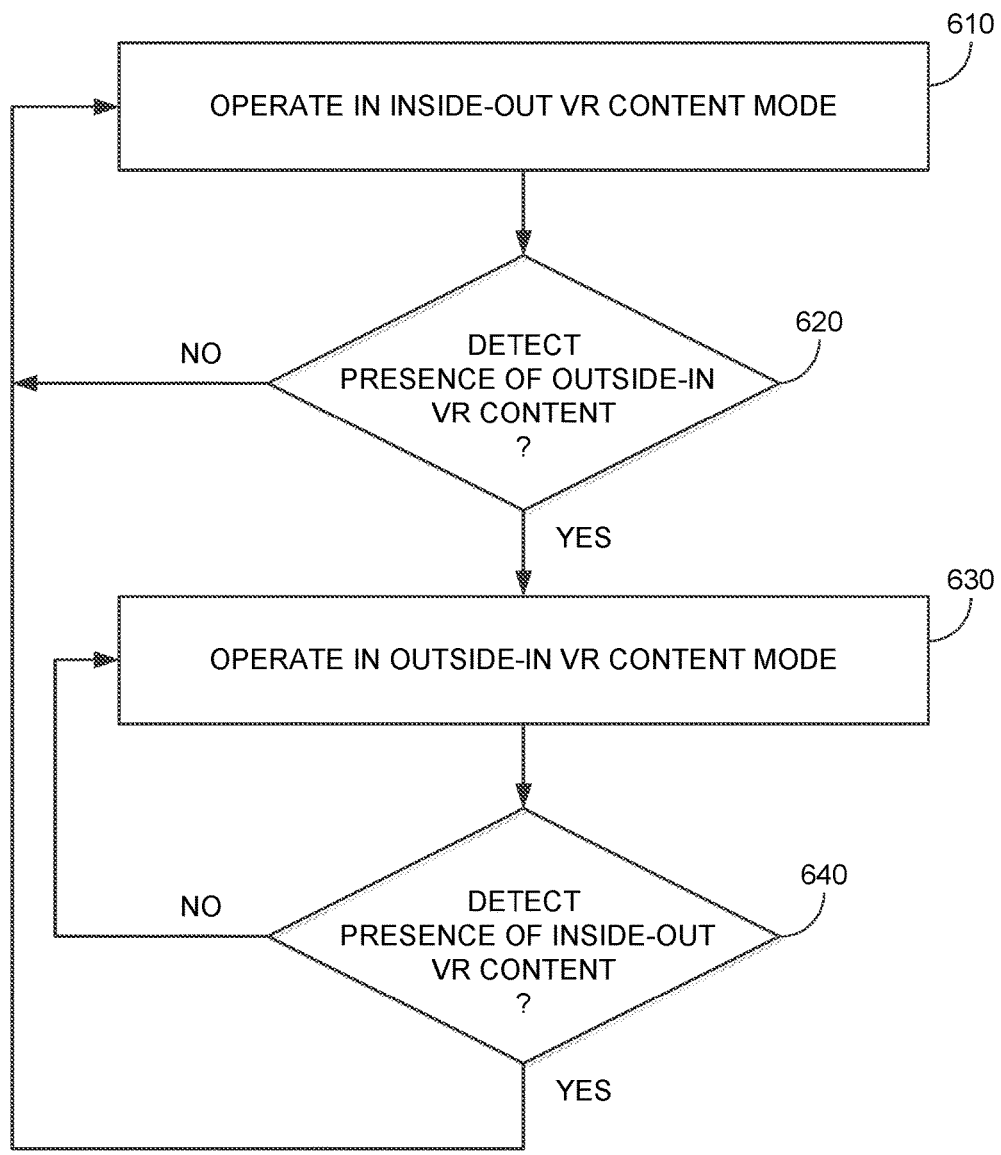
FIG. 6 is a flowchart of another example embodiment of a method.

FIG. 6 is a flowchart depicting another embodiment of a method (functionality) that may be associated with a VR system such as that depicted in FIGS. 5A and 5B, for example. As shown in FIG. 6, the method (or process) 600 may be construed as beginning at block 610, in which a VR system is operated in an inside-out VR content mode for displaying inside-out VR content. In some embodiments, operating in such a mode may be a default mode of operation for an HMD associated with the VR system. In block 620, a determination is made as to whether a presence of outside-in VR content is detected. In some embodiments, this may involve detecting activation of a driver associated with outside-in VR content, among possibly other indications. If it is determined that outside-in VR content is present, the process may proceed to block 630, in which the VR system is switched to operate in an outside-in VR content mode. If, however, outside-in VR content is not detected in block 620, the process may return to block 610.

After switching to the outside-in VR content mode for the display of outside-in VR content, the process may proceed to block 640, in which a determination is made as to whether a presence of inside-out VR content is detected. In some embodiments, this may involve determining the lack of presence of outside-in VR content or the needed outside-in sensor data, among possible other indications. If it is determined that inside-out VR content is present, the process may return to 610, in which the VR system is switched to operate in the inside-out VR content mode. If, however, inside-out VR content is not detected in block 640, the process may return to block 630, in which the outside-in VR content mode is retained.

Figure 7:
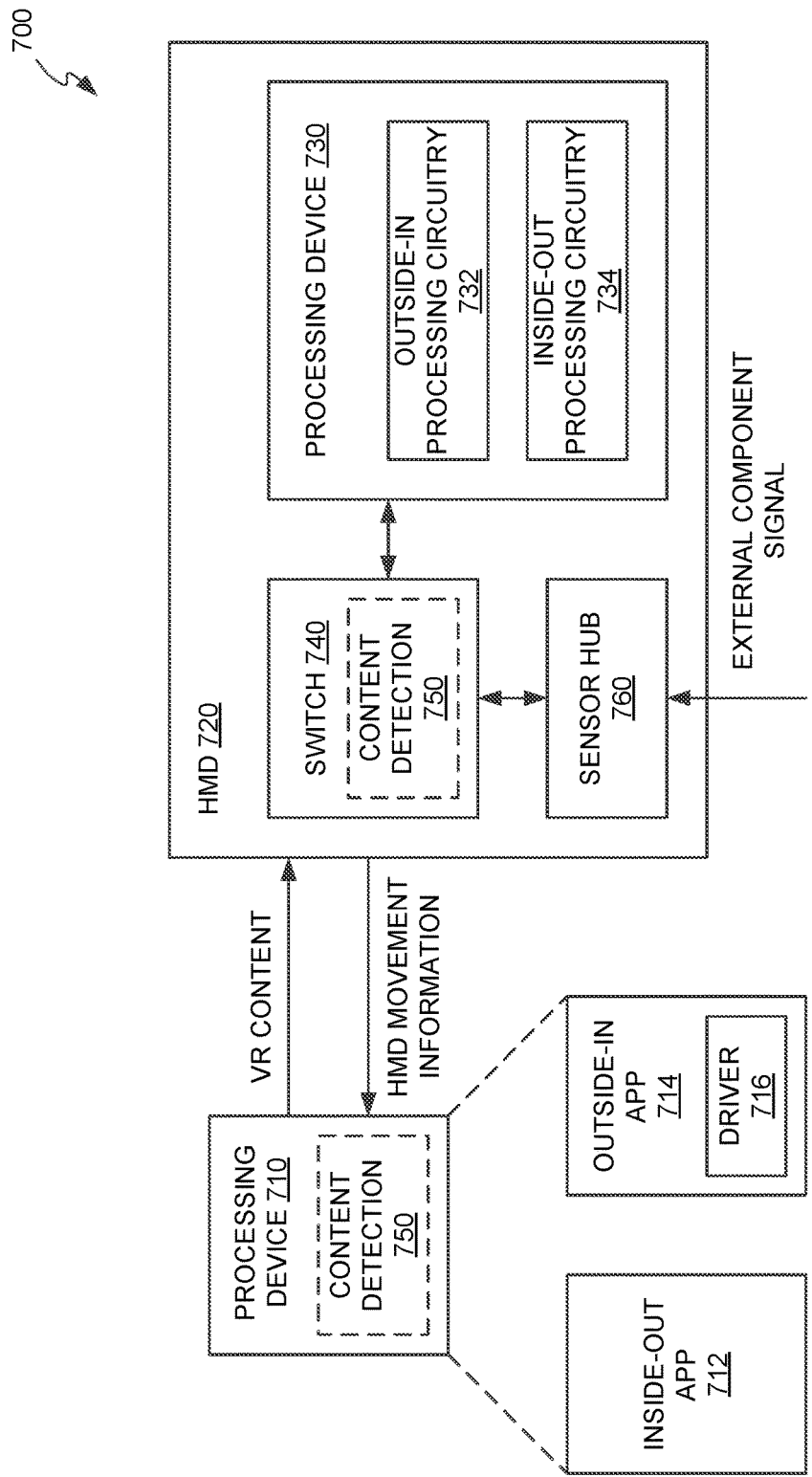
FIG. 7 is a schematic diagram of another example embodiment of a VR system.

FIG. 7 depicts another embodiment of a VR system. As shown in FIG. 7, VR system 700 incorporates a processing device 710 (which may be implemented by a personal computer (PC)) and an HMD 720. Processing device 710 includes different applications (programs) for using different types of VR content. For instance, an inside-out app 712 (e.g., a MICROSOFT® WINDOWS® HOLOGRAPH IC™ app) and an outside-in app 714 (e.g., STEAM® VR app), which includes an associated driver 716, are included.

HMD 720 incorporates a processing device 730 that includes outside-in processing circuitry 732 and inside-out processing circuitry 734. Outside-in processing circuitry 732 is configured to process outside-in VR content (e.g., VR content based on the STEAM® VR platform) and, in some embodiments, is implemented as a microcontroller unit (MCU). Inside-out processing circuitry 734 is configured to process inside-out VR content (e.g., VR content based on the MICROSOFT® WINDOWS® HOLOGRAPHIC™ platform) and, in some embodiments, is implemented as another MCU. Selective control of VR content processing (i.e., the selection of which of the processing circuitry 732/734 is enabled for processing incoming VR content) is provided by a switch 740. Switch 740 incorporates content detection circuitry 750.

In operation, execution of inside-out app 712 causes inside-out VR content to be provided to HMD 720. Switch 740, which may be configured with a default setting for inside-out VR content in some embodiments, enables inside-out processing circuitry 734 to process the VR content and provide processed image data to an associated display (not shown) of HMD 720. In some embodiments, inside-out processing circuitry 734 may be enabled by an enable signal provided by switch 740. Switch 740 is configured to selectively alter the functioning of processing device 730 to enable outside-in processing circuitry 732 to process VR content when appropriate. In some embodiments, triggering of switch 740 to enable outside-in processing circuitry 732 may be based on one or more of various criteria that may include, for example, detecting activation of driver 716, determining that application 714 is active (running in the foreground), or detecting a signal associated with an external component. It should be noted that the aforementioned determining/detecting may be facilitated by content detection circuitry 750, which may be resident on HMD 720 and/or another component (e.g., processing device 710 of a personal computer) that communicates with the HMD. Note also that in the case of detecting of a signal of an external component, a sensor hub 760 of the HMD may receive and route the signal.

Although different VR content types are presently used, it is contemplated that VR content may be integrated to an extent that permits a user to move seamlessly between inside-out and outside-in VR content environments. For such content implementations, use of signal detection (e.g., signals of accessory or external sensors) may be useful triggers to which a switch (e.g., switch 740) may respond for actuating associated processing and/or functions. For instance, as a user of an HMD configured for processing both inside-out and outside-in VR content, the user may move from a first space in which outside-in VR content is active. Beneficially, the HMD would identify the active outside-in VR content, such as by detecting a signal from an external sensor that provides HMD movement information to a sensor hub of the HMD, and respond by processing the outside-in VR content in conjunction with the outside-in movement information. Upon the user moving to a second space, in which inside-out VR content is active. At this point, the HMD would identify the active inside-out VR content (or the lack of outside-in VR content and/or sensors) and respond by processing the inside-out VR content in conjunction with movement information provided by sensors onboard the HMD.

Various functions, functional components and/or blocks have been described herein. As will be appreciated by persons skilled in the art, the functional blocks will preferably be implemented through circuits (either dedicated circuits, or general purpose circuits, which operate under the control of one or more processors and coded instructions), which will typically comprise transistors or other circuit elements that are configured in such a way as to control the operation of the circuitry in accordance with the functions and operations described herein. As will be further appreciated, the specific structure or interconnections of the circuit elements will typically be determined by a compiler, such as a register transfer language (RTL) compiler. RTL compilers operate upon scripts that closely resemble assembly language code, to compile the script into a form that is used for the layout or fabrication of the ultimate circuitry. Indeed, RTL is well known for its role and use in the facilitation of the design process of electronic and digital systems.

What is claimed is:

1. A virtual reality (VR) system for displaying VR content to a user, the system comprising:
    content detection circuitry configured to determine a type of VR content from among inside-out VR content and outside-in VR content, wherein the content detection circuitry is further configured to provide a content detection signal based on the type of VR content determined;
    processor circuitry configured to execute instructions to display the VR content in accordance with the type of VR content determined; and
    switching circuitry configured to switch, responsive to the content detection signal, between an inside-out mode, in which the processor circuitry executes instructions to display inside-out VR content and, an outside-in mode, in which the processor circuitry executes instructions to display outside-in VR content.

2. The system of claim 1, wherein:
    the processor circuitry exhibits a default to display inside-out VR content;
    the content detection circuitry is configured to detect presence of outside-in VR content; and
    the processor circuitry is further configured to display outside-in VR content responsive to the content detection circuitry detecting the presence of outside-in VR content.

3. The system of claim 1, wherein the inside-out VR content comprises VR content based on the MICROSOFT® WINDOWS® HOLOGRAPHIC™ platform.

4. The system of claim 1, wherein the outside-in VR content comprises VR content based on the STEAM® VR platform.

5. The system of claim 1, further comprising a display device configured to display images corresponding to the VR content to the user.

6. The system of claim 5, wherein the display device is a stereoscopic display of a head mounted display, the head mounted display having a head piece configured to be worn by a user to position the stereoscopic display.

7. The system of claim 1, wherein the processor circuitry comprises first processor circuitry, configured to process outside-in VR content, and second processor circuitry configured to process inside-out VR content.

8. The system of claim 7, wherein the switching circuitry is configured to switch processing between the first processor circuitry and the second processor circuitry.

9. A virtual reality (VR) method for displaying VR content to a user with a head mounted display, the method comprising:
determining a type of VR content provided to a head mounted display from among inside-out VR content and outside-in VR content by determining whether a driver associated with outside-in VR content is active;
displaying the VR content to the user with the head mounted display in accordance with the type of VR content determined such that, if the VR content is determined to be inside-out VR content, the head mounted display displays the inside-out VR content, and if the VR content is determined to be outside-in VR content, the head mounted display displays the outside-in VR content; and
switching from an inside-out VR content mode to an outside-in VR content mode to display the VR content as outside-in VR content responsive to determining that the driver associated with outside-in VR content is active.

10. The method of claim 9, wherein:
determining the type of VR content comprises detecting a component associated with outside-in VR content; and
the method further comprises switching from an inside-out VR content mode to an outside-in VR content mode responsive to detecting the component associated with outside-in VR content.

11. The method of claim 10, wherein:
the component is an accessory; and
detecting the component comprises detecting a signal transmitted by the accessory.

12. The method of claim 10, wherein:
the component is an external sensor remote from the head mounted display; and
detecting the component comprises detecting a signal transmitted by the external sensor.

13. A virtual reality (VR) system for displaying VR content to a user, the system comprising:
a head mounted display having a head piece and a display, the head piece being configured to be worn by a user to position the display, the display being configured to display the VR content to the user;
the head mounted display further comprising a first onboard sensor and a sensor hub, the first onboard sensor having sensor circuitry and being configured to determine movement of the head mounted display, the sensor hub having hub circuitry and being configured to receive movement information corresponding to movement of the head mounted display as detected by a first external sensor remote from the head mounted display;
wherein the head mounted display is configured to selectively display, via the display, inside-out VR content in accordance with the movement of the head mounted display based on the first onboard sensor and outside-in VR content in accordance with the movement of the head mounted display associated with detection by the first external sensor.

14. The system of claim 13, further comprising the first external sensor.

15. The system of claim 13, further comprising an accessory configured to transmit a signal to the sensor hub.

16. The system of claim 13, wherein the head mounted display has a switch configured to enable selective display of outside-in VR content in response to determining presence of outside-in VR content.

17. A virtual reality (VR) method comprising:
providing a head mounted display configured to display VR content to a user; and
selectively displaying inside-out VR content to the user with the head mounted display in accordance with movement of the head mounted display based on a first onboard sensor, and outside-in VR content to the user with the head mounted display in accordance with movement of the head mounted display relative to a first external sensor remotely positioned from the head mounted display.

18. The method of claim 17, further comprising:
displaying a first object to the user within a VR environment associated with the outside-in VR content, the first object corresponding to a first accessory, the first object being displayed in accordance with movement of the first accessory relative to the first external sensor.

* * * * *